United States Patent
Riel

Patent Number: 5,531,456
Date of Patent: Jul. 2, 1996

[54] THRUST COVER FOR A CENTRIFUGAL PUMP HAVING DUAL SEALING ARRANGEMENT

[75] Inventor: Axel Riel, Frankenthal, Germany

[73] Assignee: KSB Aktiengesellschaft, Frankenthal, Germany

[21] Appl. No.: 403,310

[22] Filed: Feb. 23, 1995

[30] Foreign Application Priority Data

Aug. 24, 1992 [DE] Germany ............... 42 28 042.7

[51] Int. Cl.⁶ ............................................. F16J 15/34
[52] U.S. Cl. ........................ 277/38; 277/65; 415/230
[58] Field of Search ............................. 277/9, 59, 38, 277/39, 65; 415/111, 112, 230

[56] References Cited

U.S. PATENT DOCUMENTS

| | | | |
|---|---|---|---|
| 1,862,887 | 6/1932 | Durdin, Jr. | 277/65 |
| 2,517,932 | 8/1950 | Sanders | 277/65 |
| 3,081,095 | 3/1963 | Hamrick | 277/65 |
| 3,089,423 | 5/1963 | Raub et al. | 277/65 |
| 3,582,089 | 6/1971 | Amorese | 277/65 |
| 3,600,101 | 8/1971 | Oglesby | 415/111 |
| 4,434,986 | 3/1984 | Warner | 277/65 |
| 4,669,738 | 6/1987 | Netzel | 277/65 |
| 4,746,269 | 5/1988 | Raab | 277/39 |
| 4,900,039 | 2/1990 | Klecker et al. | |

FOREIGN PATENT DOCUMENTS

| | | | |
|---|---|---|---|
| 551491 | 1/1958 | Canada | 277/65 |
| 1750857 | 4/1971 | Germany . | |
| 3906426A1 | 9/1990 | Germany . | |

*Primary Examiner*—Scott W. Cummings
*Attorney, Agent, or Firm*—Darby & Darby

[57] ABSTRACT

A centrifugal pump includes a liquid-filled interior space that is sealed by a thrust cover. The thrust cover is provided with an opening for the introduction of a shaft on the side of the thrust cover remote from the pump's interior space. A first counter abutment is disposed in the thrust cover for a first slip ring shaft seal. The thrust cover is provided with a second counter abutment for a second slip ring seal. The first and second counter abutments are disposed at different diameters and are axially offset with respect to each other. The radial distance between the first and second counter abutments is of a predetermined magnitude so that the first slip ring seal and the second slip ring seal are disposed at two different diameters.

5 Claims, 1 Drawing Sheet

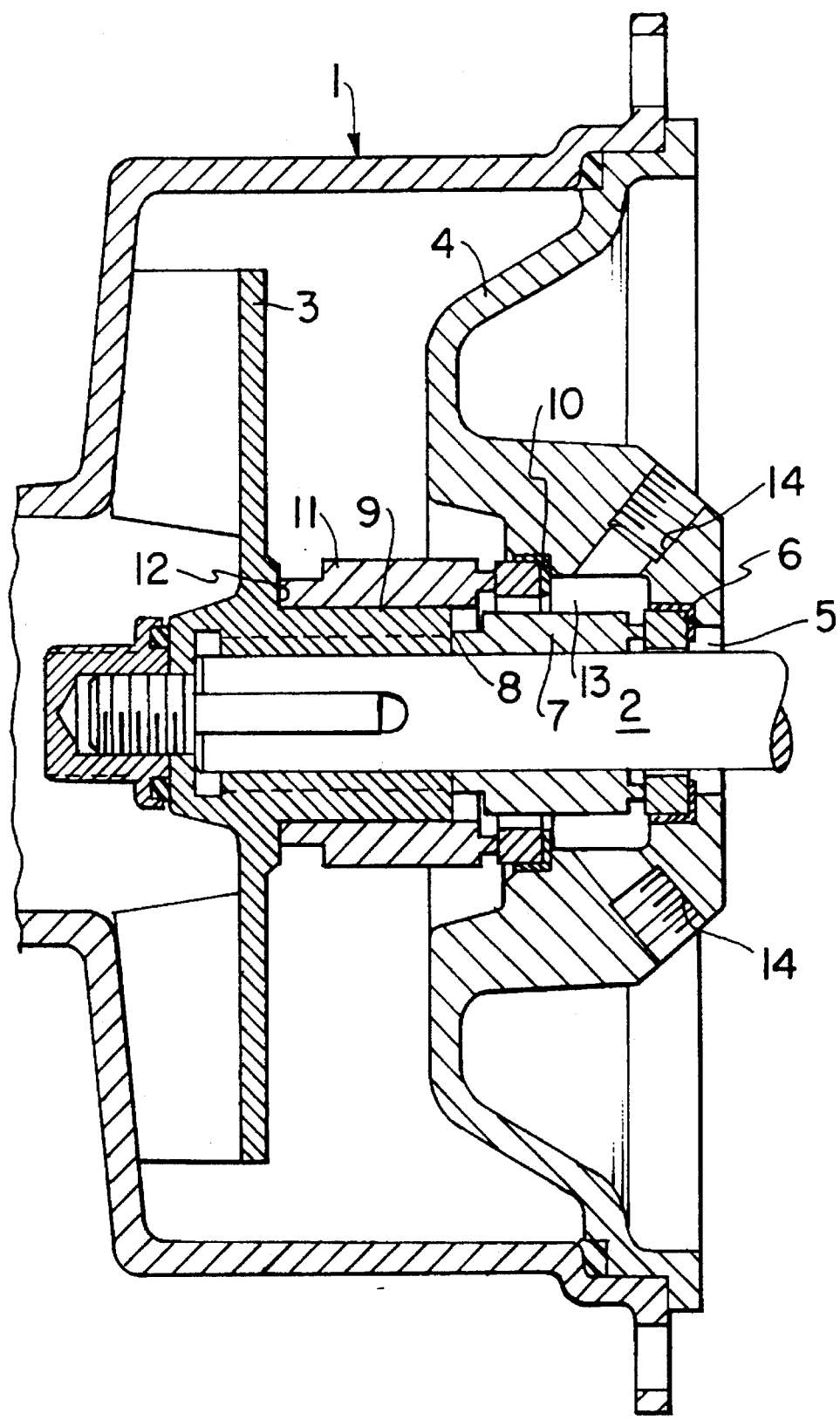

THRUST COVER FOR A CENTRIFUGAL PUMP HAVING DUAL SEALING ARRANGEMENT

This is a continuation of international application Ser. No. PCT/EP93/01884, filed Jul. 17, 1993.

BACKGROUND OF THE INVENTION

1. Field of the Invention

The invention relates to a centrifugal pump.

2. Discussion of the Related Art

For sealing off the interior of a pump from the atmosphere the most various different types of seals are known. This is a result of the type of fluid pumped, its degree of hazard and its sensitivity, the resistance to wear of a slip ring seal with respect to the fluid pumped or, respectively, the pressure of pumping and the accessibility to the slip ring seal itself. A simple solution in this respect is the ETACHROM N pump as sold by the applicant, in which within the pump housing a slip ring seal is arranged directly between the impeller and the housing.

Under difficult conditions double acting slip ring seals or even tandem seals are employed. Thus the German patent publication 1,269,436 C discloses an arrangement having an outer, double acting slip ring seal in a multi-part seal housing. In this case a special carrier is utilized, which is secured to the shaft and overlaps the slip ring seal arranged on a smaller diameter. On the outer diameter of the carrier a second slip ring seal is then arranged, which bears against a point in the seal housing. The slip rings are in this case generally arranged in the same radial plane.

A slip ring seal housing is disclosed in the U.S. Pat. No. 4,900,039, within which two slip ring seals are arranged on different diameters. The sliding surfaces thereof are simultaneously in engagement with a single rotary shaft ring. This special design with a rotary shaft ring and two stationary, non-moving counter rings is to render possible further operation with the aid of the other seal if one seal should fail.

In the case of the design in accordance with the U.S. Pat. No. 2,831,712 a double slip ring seal is arranged between the high pressure side to be sealed off and the atmosphere. In the space between the two slip ring seals a specially designed valve mechanism is to be utilized to maintain a constant differential pressure. As rotary slip rings use ring seals employed.

The present invention is directed toward a slip ring seal housing for centrifugal pumps, which can be employed for a plurality of pumps.

The present invention completely dispenses with any special slip ring seal housing, since the slip ring seal simply bears against a thrust cover, which is necessary for each pump, in the axial direction. The use of at least two counter abutments for the slip ring seal support in the axial direction renders possible an extremely wide range of variation owing to the use of the thrust cover in series of pump designs. Owing to the use of standardized seals it is possible for the user of a pump to select in a simple fashion which type of slip ring seal is to be utilized in his plant. For reasons of simplification of stock holding and reduction of costs he will generally prefer a slip ring seal type, which is already being used for his pumps.

The pump can be operated without difficulties with only a single slip ring, which is arranged on the large or small diameter. If the thrust cover is used on machines with a high drive power, there is then sufficient space available adjacent to the opening for the shaft in order to introduce a drive shaft with a larger diameter into the housing. In such a case only a single slip ring seal, arranged on the larger diameter, would be employed, since there would then no longer be space for the use of a slip ring seal arranged on the smaller diameter.

In accordance with one embodiment of the invention the slip ring seals able to be mounted on the smaller diameter are directly arranged on the drive shaft in a sealing fashion. This renders possible the use of small, low-price slip ring seals and furthermore a design without any so-called shaft protection sleeve.

Again in accordance with a further development of the invention one or both slip ring seals are arranged to engage the hub of an impeller of the last pump stage with a supporting action. This may be provided for directly or indirectly with the intermediate placement of a sealing ring. For instance, the slip ring seal located on the smaller diameter would bear against the hub end of an impeller and the slip ring seal arranged thereover, located on the larger diameter, would bear against a ledge on the hub of the impeller. The thrust cover can be utilized both on a single or a multiple stage pump, in which case in the former instance the last pump stage would be identical to the single pump stage.

In those cases, in which the use of a double slip ring seal is preferred, connections will be provided in the thrust cover in the part between the counter abutments for a liquid seal. These connections may be provided as need be or they can be permanently provided, in which case it is merely necessary to remove plugs. Accordingly it is possible to supply a cooling or flushing liquid into the space between the two slip ring seals. Simultaneously there is then a possibility of checking for the sealing action. If the liquid level remains constant in a container connected with a connection for a liquid duct, the sealing action of the slip ring seals will be constant as well. On the other hand if it changes, the sealing action of the one or the other slip ring seal will be defective. Furthermore not having a complete slip ring seal housing and an arrangement in accordance with the invention will furthermore lead to unusually rapid and simple fitting of the seal.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

The drawing FIGURE is a cross-sectional view of a single stage centrifugal pump housing.

DETAILED DESCRIPTION OF THE PREFERRED EMBODIMENT

Into a single-stage centrifugal pump housing 1 there extends a drive shaft 2, on which an impeller 3 is secured in a torque transmitting manner. The housing 1 is closed by a thrust cover 4, through whose opening 5 the shaft 2 extends into the housing. Directly adjacent to the opening 5 there is a counter abutment 6 for a slip ring seal 7 able to be applied to the smallest diameter and which bears against the terminal surface 8 of the impeller's hub 9. A further counter abutment 10 for a slip ring seal 11 arranged on a larger diameter is located axially offset toward the impeller on the thrust cover 4. The slip ring seal 11 secured here bears against a ledge 12 on the impeller 3. The sealing action is provided here on the hub 9 of the impeller 3 and directly on the shaft 2. The example selected here shows that the space 13 between the two slip ring seals 7 and 11 is accessible from the outside through two oppositely placed connections 14.

In case of need it is possible for liquid ducts to be connected to connection 14 or such connections 14 may be provided later.

In the case of the slip ring seals 7 and 11 it may be a question of slip ring seals of s standardized design series, which are identical in structure but differ in dimensions. Dependent of the requirement, personal preference or purpose of use it is possible for only one slip ring seal or two slip ring seals to be utilized. The thrust cover may be manufactured as a casting or sheet metal pressing. Its method of manufacture will not have any effect on the arrangement of the counter abutments.

I claim:

1. A centrifugal pump comprising:

liquid-filled interior space sealed by a thrust cover, the thrust cover being provided with an opening for the introduction of a shaft on the side of the thrust cover remote from the pump's interior space, a first counter abutment is disposed in the thrust cover for a first slip ring shaft seal the thrust cover is provided with a second counter abutment for a second slip ring seal, in that the first and second counter abutments are disposed at different diameters and are axially offset with respect to each other, the radial distance between the first and second counter abutments is of a predetermined magnitude so that the first slip ring seal and the second slip ring seal are disposed at two different diameters.

2. The centrifugal pump as claimed in claim 1, wherein the first slip ring seal is mounted on the smaller diameter of said two diameters and is arranged directly on the drive shaft in a sealing manner.

3. The centrifugal pump as claimed in claim 1, wherein at least one of the first and second slip ring seals rest in a supporting manner on the hub of an impeller of the centrifugal pump.

4. The centrifugal pump as claimed in claim 1, the wherein the space between the first and second counter abutments is provided with connections for a liquid duct.

5. The centrifugal pump as claimed in claim 1, wherein the first and second slip ring seals each have an axial dimension and a radial dimension, said axial dimension being substantially greater than said radial dimension.

* * * * *